(No Model.)
A. MAJOR.
WATER FILTER AND COOLER.
No. 577,965. Patented Mar. 2, 1897.
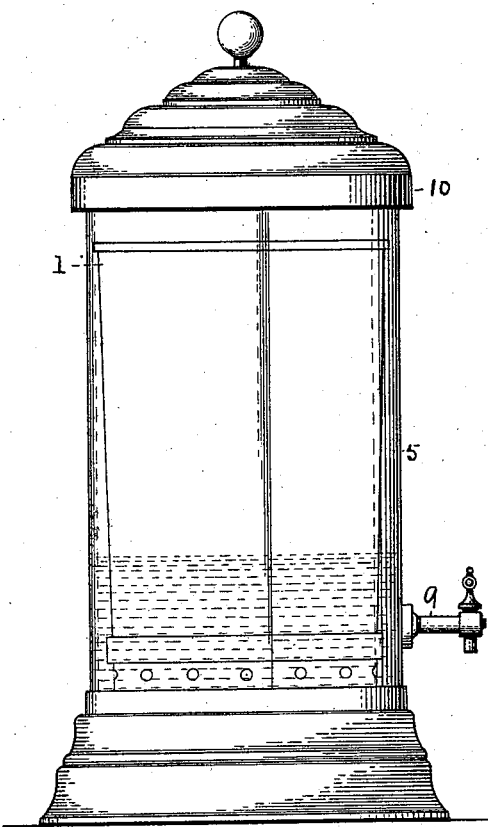
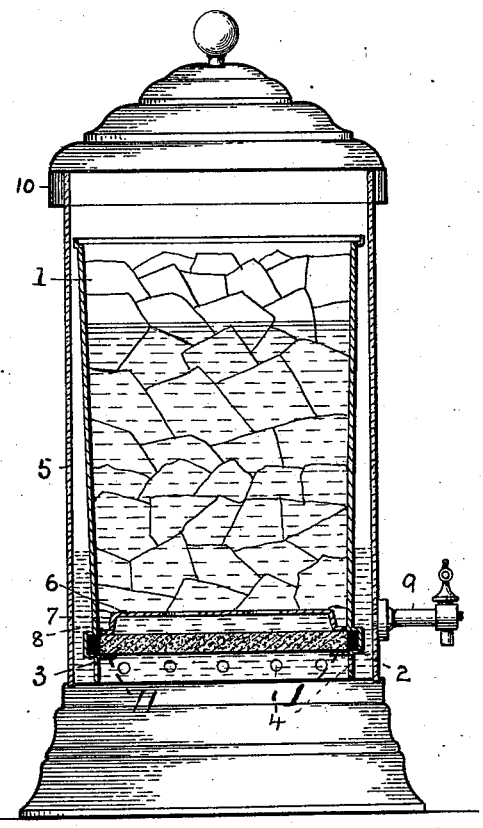
Witnesses
John R. Taylor
B. H. Levett
Inventor
Alphouse Major
By his Attorney
Norris H. Clark

UNITED STATES PATENT OFFICE.

ALPHONSE MAJOR, OF NEW YORK, N. Y.

WATER FILTER AND COOLER.

SPECIFICATION forming part of Letters Patent No. 577,965, dated March 2, 1897.

Application filed November 8, 1895. Serial No. 568,322. (No model.)

*To all whom it may concern:*

Be it known that I, ALPHONSE MAJOR, a citizen of the United States, and a resident of New York city, in the county and State of New York, have invented a certain new and useful Improvement in Water Filtering and Cooling Devices, of which the following is a specification.

This invention relates to water filtering and cooling devices, and aims to provide a combined filter and cooler which can be used in connection with any ordinary water-cooler or similar receptacle to purify the water and bring it to a proper temperature for drinking.

The principal objects sought to be attained are simplicity and economy of construction, accessibility to the parts for making repairs, cleansing, and for other purposes, compactness, lightness, effectiveness, and durability.

Other objects and advantages are contemplated and will appear as the character of the improvement is better understood; and to this end and such others as pertain to the nature of the improvement the latter consists in certain details of construction, novel features, and peculiar combination of the parts, which hereinafter will be more fully described and finally claimed.

The invention is susceptible of various modifications, changes in the form, and proportion of the parts without departing from the essence of the improvement, and in order to show an embodiment of the same reference is to be had to the annexed drawings, in which—

Figure 1 is a side elevation of an ordinary water-cooler having the invention applied. Fig. 2 is a vertical central section thereof.

The invention consists, essentially, of the vessel to be placed in a water cooler or receptacle of ordinary construction, and this vessel is represented by the numeral 1 and is constructed of sheet metal, preferably galvanized iron, and is formed near its lower end on the inner side with an annular groove 2, which is spun therein or formed in any of the usual ways. The filtering-stone 3 has its edge portion opposite the groove 2 and cemented therein so as to provide a close joint, and this filtering-stone may be of any desired material generally employed for filtering water. That portion of the vessel below the filtering-stone 3 is provided with a series of openings 4 for the free passage of the filtered water from the space below the part 3 into the space existing between the opposing sides of the vessel 1 and the cooler or receptacle 5 within which the vessel 1 is placed.

A suitable rest 6 is placed upon the filtering-stone 3 and prevents injurious contact therewith when placing ice in the vessel 1 for cooling water. This rest has a depending rim 7, formed with a flange 8 at its lower edge to obtain a broad bearing upon the filtering-stone 3 to prevent cutting and wearing away of the said stone, and by having the middle portion of the rest elevated the weight of the ice is transmitted to the edge portion of the filtering-stone, where it obtains a firm support upon an inner flange 11 below the groove 2, thereby preventing the giving way of the said stone at the middle, which would be likely to result if the weight were distributed over the surface of the stone 3 or came upon the middle portion thereof. This rest is perforated to provide for the free passage therethrough of the water, as will be readily understood.

The vessel 1 is placed within a suitable receptacle 5, and the water to be filtered is poured therein, and the ice for cooling the water is dropped into the water in the vessel 1 or is placed upon the rest 6 prior to pouring the water into the said vessel. The water percolates through the filtering-stone 3 and passes into the space formed between the opposing sides of the vessel 1 and the receptacle 5, and is drawn from the vessel 5 for use through the cock or faucet 9, let into the side of the receptacle 5. A cover 10 closes the opened end of the receptacle 5, so as to exclude dust and other foreign matter from gaining access to the water and fouling the same.

From the foregoing it will be seen that the device is exceedingly simple and is capable of being easily cleaned and readily repaired at a nominal cost and that the filter can be applied to any form of cooler or receptacle.

The flange 11 extends inward from the sides of the vessel 1 in the plane of the lower side of the groove 2 and forms a support for the filtering-stone and affords an upbearing surface of sufficient extent to prevent the chipping of the stone or the cracking thereof.

This is essential, as the diameter of the stone is equal to that of the vessel at this point. The cement joint prevents impurities passing around the edges of the stone into the space receiving the filtered water. This support also receives the perpendicular thrust of the weight sustained by the ice-rest by reason of the rim 7 and flange 8 coming directly thereabove.

Having thus described the invention, what is claimed as new, and desired to be secured by Letters Patent, is—

In a water cooler and filter, the combination with a vessel having an inner annular groove and a flange corresponding with the lower wall of the groove, and a filtering-stone supported upon the said flange and cemented at its edge into the aforementioned annular groove, of an ice-rest comprising an elevated perforate portion and a depending rim terminating in an outer flange to obtain an extended bearing upon the filtering-stone directly above the aforesaid inner flange, substantially as shown and described.

In testimony that I claim the foregoing as my invention I have signed my name, in presence of two witnesses, this 29th day of October, 1895.

ALPHONSE MAJOR.

Witnesses:
S. D. DITCHETT,
E. M. HILLS.